Dec. 1, 1931.  C. D. ELLIS  1,834,448
REVERSE MOVEMENT CONTROL FOR DRIVE SHAFTS
Filed Jan. 30, 1930
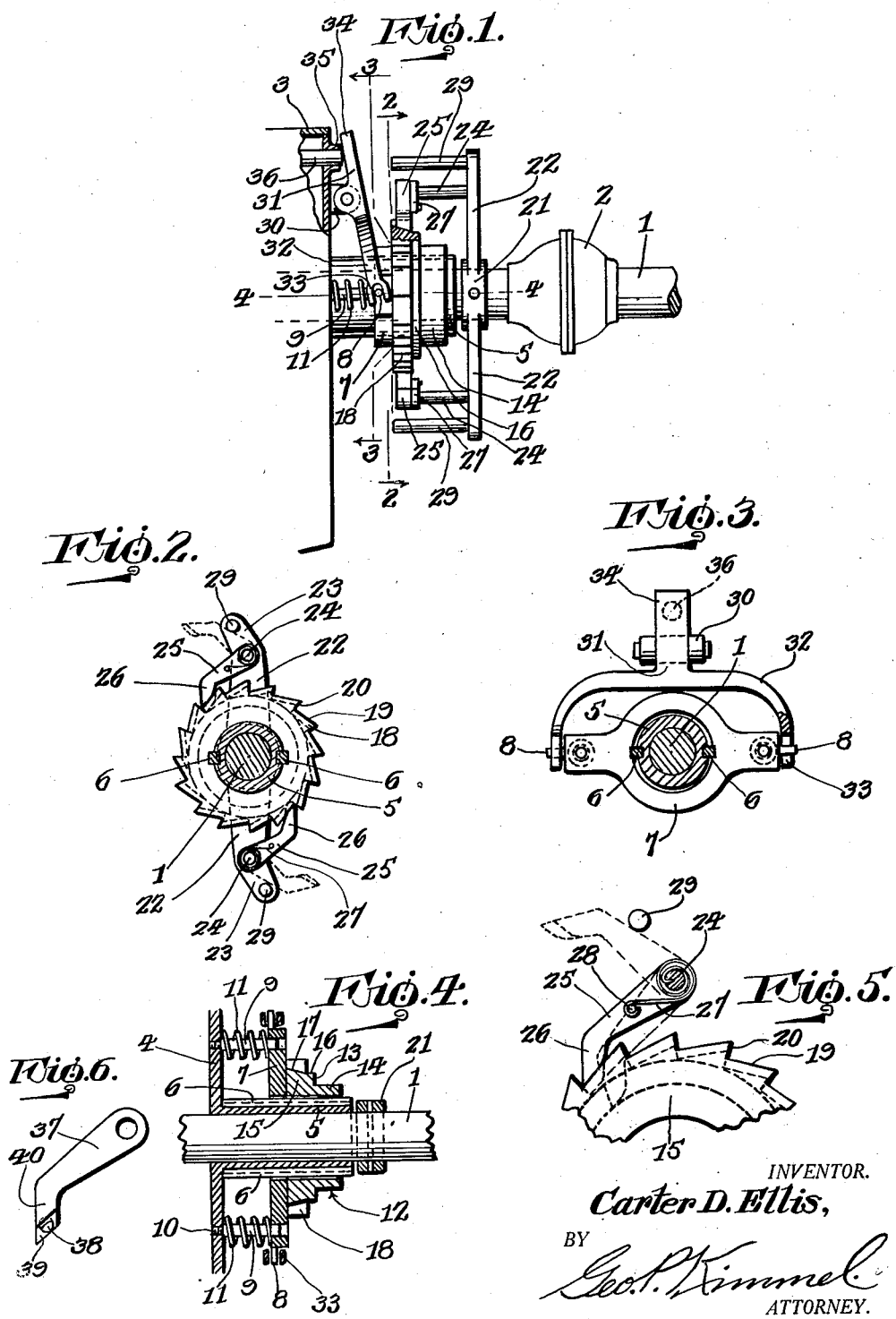
INVENTOR.
Carter D. Ellis,
BY
Geo. P. Kimmel
ATTORNEY.

Patented Dec. 1, 1931

1,834,448

UNITED STATES PATENT OFFICE

CARTER D. ELLIS, OF ERIE, PENNSYLVANIA

REVERSE MOVEMENT CONTROL FOR DRIVE SHAFTS

Application filed January 30, 1930. Serial No. 424,584.

This invention relates to a device for controlling reverse movement of drive shafts, being particularly adapted for use in connection with motor vehicles, and has for its primary object to provide, in a manner as hereinafter set forth, a device of such character by means of which a vehicle may be prevented from rolling backward when stopped on an incline, thereby enabling the operator of the vehicle to release the brake preparatory to letting in the clutch whereby the starting of the vehicle under such conditions is greatly facilitated.

A further object of the invention is to provide a device of the character aforesaid which may be utilized as a brake when parking a vehicle on an incline.

A further object of the invention is to provide a device of the character aforesaid which is extremely simple in construction, positive, efficient and automatic in operation, and inexpensive to manufacture and install with respect to a drive shaft and gear shifting mechanism of conventional type.

With the foregoing and other objects in view, the invention consists of the novel construction, combination and arrangement of parts as hereinafter more particularly described, and as illustrated in the accompanying drawings wherein is shown an embodiment of the invention, but it is to be understood that the description and drawings are to be taken as illustrative and that the invention is intended to be limited only by the scope of the claims hereunto appended.

In the accompanying drawings in which like numerals are employed to designate like parts throughout the several views:—

Figure 1 is a side elevation of a control device in accordance with this invention showing the same in operative position with respect to a conventional drive shaft for a motor vehicle.

Figure 2 is a section taken on the line 2—2 of Figure 1.

Figure 3 is a section taken on the line 3—3 of Figure 1.

Figure 4 is a section taken on the line 4—4 of Figure 1.

Figure 5 is an enlarged fragmentary detailed view of the ratchet and pawl, showing the various positions of the latter.

Figure 6 is a detail view of a modified form of pawl.

Referring to the drawings in detail, the numeral 1 designates a motor vehicle drive shaft equipped with the usual universal joint 2 spaced rearwardly from the transmission housing 3. Projecting from the rear wall 4 of the housing 3 is a sleeve 5 through which the shaft 1 loosely extends. In the embodiment shown, the sleeve 5 is formed integral with the rear wall 4 although it might be a separate piece secured to the wall in any suitable manner, if desired. Slidably mounted on the sleeve 5, by means of a pair of longitudinal keys 6, is a horizontally disposed cross head 7 from the ends of which project a pair of longitudinally aligned pins 8. Slidably extending transversely through the end portions of the cross head 7, adjacent the pins 8, are a pair of guide rods 9, the forward ends 10 of which are threaded into the rear wall 4 of the housing. Encircling the guide rods 9 are a pair of coiled springs 11, the compression of which normally maintains the cross head in spaced relation to the rear wall 4.

Slidably mounted on the sleeve 5 by means of the keys 6 is a hub element indicated generally at 12 which is disposed rearwardly of the cross head 7 and is secured thereto in any suitable manner so as to slide therewith. Substantially midway between the ends thereof, the hub element 12 is formed with a radially projecting, annular shoulder 13 which divides the hub element into a rearward portion 14 and a forward portion 15, the latter being of greater diameter than the former. The peripheral face of the rearward portion 14, transversely of said face, is disposed in parallel relation to the axis of the hub element whereby the rearward portion 14 is of uniform diameter throughout. The forward portion 15 is provided with a peripheral face portion 16 disposed in parallel relation to the axis of the hub transversely of such face portion. Merging into the peripheral face portion 16 is a peripheral face portion 17 which inclines forwardly and upwardly from the portion 16.

Formed on the peripheral face 17 is a series of ratchet teeth 18, each of which is formed with a longitudinally inclined face 19 and a substantially abrupt face 20. Transversely thereof the teeth 18 incline outwardly and forwardly in conformity with the peripheral face 17 upon which they are formed.

Mounted on the shaft 1 to rotate therewith, rearwardly of the hub element 12, is a vertically disposed cross head 21, the arms 22 of which are formed with angularly disposed end portions 23. Projecting forwardly from the arms 22, adjacent the end portions 23, are a pair of pins 24, upon each of which a pawl 25 is pivotally mounted. Each pawl 25 is formed with an end portion 26 extending at an angle toward the hub element 12. The outer end faces of the portions 26 are inclined in conformity with the faces 19 of the teeth 18.

The pawls 25 are normally maintained in engagement with the teeth 18 by means of springs 27, one end of each of which is secured to a pin 24, and the other end of which is secured to a lug 28 projecting from a pawl 25. Projecting from the angularly disposed end portions 23 of the arms 22, adjacent the free ends of the portions 23, are a pair of stop pins 29 which are disposed outwardly from the pins 24 and forwardly thereof in the normal rotation of the cross head.

Projecting from the rear wall 4 of the housing is a bifurcated lug 30 to which is pivoted a yoke 31, the arms 32 of which are bifurcated as indicated at 33 to receive therein the pins 8 projecting from the ends of the cross head 7. The upper end portion 34 of the yoke 31 is normally maintained against a boss 35 formed on the rear wall 4. Extending through the boss 35 in proximity to the upper end portion 34 of the yoke is a shifting rod 36 which is operatively connected with the gear shift lever of the vehicle, not shown, in order that the rod 36 may be moved in a rearward direction when the gear shift lever is shifted in a manner to reverse the gears within the transmission. The transmission gears and shift lever are not shown as they may be of any well known type now in common use.

In the operation of the device, the pawls 25 are normally maintained in engagement with the teeth 18 by means of the springs 27. Upon the rotation of the cross head 21 in a clockwise direction as viewed in Figure 2, the pawls 25 ride over the inclined faces 19 of the teeth 18, and the springs 27 are of appropriate strength that when the vehicle has attained a speed of approximately two miles per hour, the pawl 25 will be lifted from engagement with the teeth by centrifugal force, such lifting action continuing as the vehicle gains speed until the pawls are brought into engagement with the stop pins 29. Thus it will be seen that during the normal operation of the vehicle, the pawls will be maintained out of engagement with the teeth except at extremely low speeds of the vehicle.

Upon the stopping of the vehicle the pawls 25 are again engaged with the teeth 18 by the action of the springs 27 and due to the engagement of the pawls with the abrupt faces 20 of the teeth 18, any rotation of the cross head 21 in a counter-clockwise direction will be prevented.

Owing to the disposition of the upper end portion 34 of the yoke 31 with respect to the shifting rod 36, the vehicle may be reversed in the usual manner as the yoke is swung about its pivot when the shift lever for the vehicle is shifted in a manner to reverse the gears in the transmission. Upon the swinging of the yoke about its pivot the cross head 7 and hub element 12 are moved forwardly along the sleeve 5 against the tension of the springs 11 whereby the pawls 25 are brought into engagement with the peripheral face of the rearward portion 14 of the hub element 12. Upon the shifting of the shift lever from reversing position the cross head 7 and hub element 12 are again forced rearwardly by the action of the springs 11 in order to bring the teeth 18 into alignment with the pawls 25 when the latter are thrown outwardly by centrifugal force upon a forward movement of the vehicle. Owing to the forwardly inclined faces of the teeth 18 and end portions 26 of the pawls 25, a positive contact is ensured between the teeth and pawls.

If it is desired to move the vehicle in a rearward direction by hand, this may be accomplished by first shifting the gear shift lever in a manner to reverse the gears, and then shifting the lever to neutral position. Upon the forward movement of the hub element 12 when the gear shift lever is shifted to reverse the gears, the pawls 25 are forced into contact with the smooth peripheral face of the portion 14 by the action of the springs 27, and when the gear shift lever is shifted to neutral position, the portion 15 of the hub element will be prevented from sliding under the pawls by the abutment of the latter with the shoulder 13. Upon a forward motion of the vehicle, the pawls will be thrown outwardly by centrifugal force to permit the return of the hub element to its normal position.

In Figure 6 of the drawings, I have shown a modified form of pawl designated by the numeral 37. The pawl 37 is the same as the pawls 25 except that it is provided with a ball bearing 38 projecting from the beveled face 39 of the angularly disposed end portion 40. The ball bearing 38 is adapted for rolling contact with the teeth of the hub element, and permits a free relative movement between the teeth and pawl.

It is thought that the many advantages of a control device in accordance with this invention will be readily apparent, and although the preferred embodiment of the invention is as illustrated and described, it is to be understood that changes in the size, shape and arrangement of parts may be resorted to, so long as such changes fall within the scope of the invention as defined in the appended claims.

What I claim is:

1. In a device for controlling reverse movement of a drive shaft, a non-rotatable ratchet gear slidable in a plane lengthwise of the shaft, a cross head mounted on the shaft to rotate therewith, a pawl pivotally connected with the cross head, and tension means normally forcing the pawl into engagement with the ratchet gear, said gear and pawl having their contacting faces correspondingly beveled axially of the shaft.

2. In a devise for controlling reverse movement of a drive shaft, a non-rotatable ratchet gear slidable in a plane lengthwise of the shaft, a cross head mounted on the shaft to rotate therewith, a pawl pivotally connected with the cross head, and tension means normally forcing the pawl into engagement with the ratchet gear, said pawl being movable out of engagement with the ratchet gear by centrifugal force, said gear and pawl having their contacting faces correspondingly beveled axially of the shaft.

3. In a device for controlling reverse movement of a motor vehicle drive shaft, a cross head mounted on the shaft to rotate therewith, a spring actuated pawl pivotally connected with the cross head, a non-rotatable hub element slidable in a plane lengthwise of the shaft, said hub element having a portion provided on its periphery with ratchet teeth, tension means normally maintaining the hub element in operative position for the engagement of the ratchet teeth by the pawl, and means adapted to be operatively connected with the reverse gear shifting mechanism of the vehicle to force the hub element out of operative position.

4. In a device for controlling reverse movement of a motor vehicle drive shaft, a hub element slidable in a plane lengthwise of the shaft, said hub element having a portion provided on its periphery with ratchet teeth, a cross head mounted on the shaft to rotate therewith, a pawl pivotally connected with the cross head, a tension element normally forcing the pawl into engagement with the ratchet teeth, tension means normally maintaining the hub element in operative position for the engagement of the ratchet teeth by the pawl, said pawl being movable out of engagement with the ratchet teeth by centrifugal force, and means adapted to be operatively connected with the reverse gear mechanism of the vehicle to force the hub element out of operative position.

5. In a device for controlling reverse movement of a motor vehicle drive shaft, a cross head mounted on the shaft to rotate therewith, a spring actuated pawl pivotally connected with the cross head, a non-rotatable hub element slidable in a plane lengthwise of the shaft, said hub element having a portion provided on its periphery with ratchet teeth and further having a portion with a smooth peripheral face and of less diameter than the portion provided with ratchet teeth, tension means normally maintaining the hub element in operative position for the engagement of the ratchet teeth by the pawl, and means adapted to be operatively connected with the reverse gear shifting mechanism for the vehicle to force the hub element into a position to bring the smooth peripheral face portion thereof into alignment with the pawl.

6. In a device for controlling reverse movement of a motor vehicle drive shaft, a cross head mounted on the shaft to rotate therewith, a spring actuated pawl pivotally connected with the cross head, a non-rotatable hub element slidable in a plane lengthwise of the shaft, said hub element having a portion provided on its periphery with ratchet teeth and further having a portion with a smooth peripheral face and of less diameter than the portion provided with ratchet teeth, tension means normally maintaining the hub element in operative position for the engagement of the ratchet teeth by the pawl, and means adapted to be operatively connected with the reverse gear shifting mechanism for the vehicle to force the hub element into a position to bring the smooth peripheral face portion thereof into alignment with the pawl, said teeth and pawl having their contacting faces correspondingly bevelled axially of the shaft.

In testimony whereof, I affix my signature hereto.

CARTER D. ELLIS.